Patented Dec. 20, 1932

1,891,601

UNITED STATES PATENT OFFICE

WALTER E. LAWSON, OF WILMINGTON, DELAWARE, ASSIGNOR TO E. I. DU PONT DE NEMOURS & COMPANY, OF WILMINGTON, DELAWARE, A CORPORATION OF DELAWARE

UNSYMMETRICAL DIARYL ETHANES AS PLASTICIZERS

No Drawing. Application filed May 28, 1928. Serial No. 281,371.

This invention relates to plasticizers and more particularly to a plasticizer for cellulose derivatives.

An object of this invention is to provide a plasticizer for cellulose derivatives which will give a clear, flexible film. A further object is to produce such a film having improved water resistance. Other objects will appear hereinafter.

These objects may be attained by the use of unsymmetrical diphenyl ethane as a plasticizer for cellulose derivatives.

The following examples illustrate embodiments of my invention:

Example 1

|  | Parts by weight |
|---|---|
| Cellulose acetate, low viscosity | 12 |
| Unsymmetrical diphenyl ethane | 2 |
| Solvent { 80% acetone / 20% diacetone alcohol } | 86 |

Example 2

|  | Parts by weight |
|---|---|
| Pyroxylin | 10 |
| Unsymmetrical diphenyl ethane | 3.6 |
| Solvent { 90% ethyl acetate / 10% butyl acetate } | 86.4 |

Clear, pliable films may be obtained from the above mixtures.

In place of unsymmetrical diphenyl ethane I may substitute any unsymmetrical diaryl ethane, for example ditolyl ethane, dixylyl ethane or dinitro diphenyl ethane or their equivalents. In place of cellulose acetate or cellulose nitrate I may substitute any cellulose derivatives, including cellulose ethers, for example, ethyl cellulose or benzyl cellulose.

The formula for the unsymmetrical diaryl ethane is $(AR)_2 CH CH_3$; the formula for the unsymmetrical diphenyl ethane is $(C_6H_5)_2 CH CH_3$; the structural formula for unsymmetrical diaryl ethane is probably

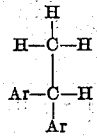

and the structural formula for diphenyl ethane is probably

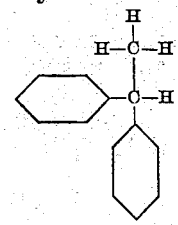

In the above formulæ Ar represents an aryl group.

My described invention will be found useful not only in plastics generally, but also in coating compositions, and I have found that compositions made according to my invention produce films which are not only clear and flexible, but which are also highly resistant to water.

As many apparently widely different embodiments of this invention may be made without departing from the spirit and scope thereof, it is to be understood that I do not limit myself to the specific embodiments thereof except as defined in the appended claims.

I claim:

1. A composition of matter containing a cellulose derivative and unsymmetrical diphenyl ethane.

2. A composition of matter containing a cellulose ester and unsymmetrical diphenyl ethane.

3. A composition of matter containing cellulose acetate and unsymmetrical diphenyl ethane.

4. A composition of matter containing cellulose acetate, unsymmetrical diphenyl ethane and a solvent.

5. A composition of matter containing cellulose acetate, unsymmetrical diphenyl ethane and a solvent, said solvent containing acetone and diacetone alcohol.

6. A composition of matter containing a cellulose derivative and an unsymmetrical diaryl ethane from the group consisting of diphenyl ethane, ditolyl ethane, dixylyl ethane, and dinitrodiphenyl ethane.

7. A composition of matter containing a cellulose ester and an unsymmetrical diaryl ethane from the group consisting of diphenyl ethane, ditolyl ethane, dixylyl ethane, and dinitrodiphenyl ethane.

8. A composition of matter containing cellulose acetate and an unsymmetrical diaryl ethane from the group consisting of diphenyl ethane, ditolyl ethane, dixylyl ethane, and dinitrodiphenyl ethane.

9. A composition of matter containing a cellulose derivative and unsymmetrical ditolyl ethane.

10. A composition of matter containing a cellulose derivative and unsymmetrical dixylyl ethane.

11. A composition of matter containing a cellulose ester and unsymmetrical ditolyl ethane.

12. A composition of matter containing a cellulose ester and unsymmetrical dixylyl ethane.

In testimony whereof, I affix my signature.

WALTER E. LAWSON.